(12) United States Patent
Nagata et al.

(10) Patent No.: US 10,910,631 B2
(45) Date of Patent: Feb. 2, 2021

(54) NON-AQUEOUS ELECTROLYTE SECONDARY BATTERY

(71) Applicant: Panasonic Intellectual Property Management Co., Ltd., Osaka (JP)

(72) Inventors: Kaoru Nagata, Osaka (JP); Noriko Manabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 19 days.

(21) Appl. No.: 16/081,191

(22) PCT Filed: Feb. 1, 2017

(86) PCT No.: PCT/JP2017/003523
§ 371 (c)(1),
(2) Date: Aug. 30, 2018

(87) PCT Pub. No.: WO2017/150055
PCT Pub. Date: Sep. 8, 2017

(65) Prior Publication Data
US 2019/0067677 A1    Feb. 28, 2019

(30) Foreign Application Priority Data
Mar. 4, 2016  (JP) ................ 2016-042370

(51) Int. Cl.
*H01M 4/131* (2010.01)
*H01M 4/525* (2010.01)
(Continued)

(52) U.S. Cl.
CPC .......... *H01M 4/131* (2013.01); *H01M 4/366* (2013.01); *H01M 4/483* (2013.01); *H01M 4/525* (2013.01);
(Continued)

(58) Field of Classification Search
CPC ....... H01M 4/131; H01M 4/483; H01M 4/525
See application file for complete search history.

(56) References Cited

U.S. PATENT DOCUMENTS

2014/0306150 A1* 10/2014 Kim ...................... C01D 15/02
                                              252/182.1
2014/0308584 A1* 10/2014 Endo .................... H01M 4/525
                                              429/223
(Continued)

FOREIGN PATENT DOCUMENTS

JP      2010-70427 A    4/2010
JP      2013-65468 A    4/2013
(Continued)

OTHER PUBLICATIONS

International Search Report dated May 16, 2017, issued in counterpart International Application No. PCT/JP2017/003523 (2 pages).

*Primary Examiner* — Ula C Ruddock
*Assistant Examiner* — Thomas H. Parsons
(74) *Attorney, Agent, or Firm* — Westerman, Hattori, Daniels & Adrian, LLP

(57) ABSTRACT

A non-aqueous electrolyte secondary battery according to one mode of the present disclosure is provided with: a positive electrode including a positive-electrode active material layer; a negative electrode; and a non-aqueous electrolyte, wherein the positive-electrode active material layer includes positive-electrode active material particles having a particle size distribution in which the difference (D90-D10) between a 90% diameter (D90) and a 10% diameter (D10) measured with a laser diffraction method is larger than 13 μm. In addition, the positive-electrode active material layer is characterized in that, on an arbitrarily defined cross section thereof, the total area of positive-electrode active material particles A, each of which has a particle size not smaller than 15 μm and has a particle area
(Continued)

at least 0.8-fold the area of a circle circumscribing the positive-electrode active material particle, is 20% or larger with respect to the total area of the cross section.

7 Claims, 4 Drawing Sheets

(51) Int. Cl.
- *H01M 4/48* (2010.01)
- *H01M 4/36* (2006.01)
- *H01M 10/0525* (2010.01)
- *H01M 4/02* (2006.01)
- *H01M 4/62* (2006.01)

(52) U.S. Cl.
CPC ........ *H01M 10/0525* (2013.01); *H01M 4/625* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2015/0093641 A1 | 4/2015 | Mitsumoto et al. | |
| 2017/0309911 A1* | 10/2017 | Ryoshi | H01M 4/525 |

FOREIGN PATENT DOCUMENTS

| | | | |
|---|---|---|---|
| JP | 2013-114848 A | | 6/2013 |
| JP | 2013-232318 A | | 11/2013 |
| WO | 2016/017092 A1 | | 2/2016 |
| WO | WO2016017092 | * | 2/2016 |

* cited by examiner

NON-AQUEOUS ELECTROLYTE SECONDARY BATTERY

TECHNICAL FIELD

The present disclosure relates to non-aqueous electrolyte secondary batteries.

BACKGROUND ART

Patent Literature 1 discloses a lithium composite oxide having an average particle diameter of more than 4 μm and less than 20 μm, wherein the ratio of the area of a primary particle to the area of a secondary particle, the size of which corresponds to the average particle diameter, is 0.004 to 0.035 and wherein a minimum value of crushing strength is more than 70 MPa. Patent Literature 1 also states that the use of the lithium composite oxide as a positive electrode material for a non-aqueous electrolyte secondary battery provides improvements in service life characteristics and initial charge-discharge characteristics of the battery and in slurry characteristics.

CITATION LIST

Patent Literature

Patent Literature 1: JP 2013-232318 A

SUMMARY

During charge/discharge of a non-aqueous electrolyte secondary battery, an electrolyte solution enters or exits from an active material layer of the battery. For non-aqueous electrolyte secondary batteries, the following are important issues: constructing a structure that allows the electrolyte solution to enter and exit from the positive electrode uniformly and quickly and thereby reducing the battery internal resistance; and facilitating transfer of the electrolyte solution to the negative electrode and thereby improving the service life characteristics. In non-aqueous electrolyte secondary batteries, positive electrode active material particles may swell or shrink in association with charge/discharge and be consequently broken. Reducing the occurrence of such particle breakage to prevent deterioration in capacity is also an important issue for non-aqueous electrolyte secondary batteries. If the particle breakage occurs to divide the positive electrode active material particles into smaller pieces, the entry and exit of the electrolyte solution will be more difficult, which tends to cause an increase in internal resistance.

The particle breakage and increase in internal resistance are particularly likely to occur when, for example, an attempt to achieve a high capacity is made by increasing the packing density of the positive electrode active material in the positive electrode or by using as a negative electrode active material a substance such as silicon oxide which undergoes a large volume change in association with charge/discharge.

A non-aqueous electrolyte secondary battery according to an aspect of the present disclosure includes a positive electrode having a positive electrode active material layer, a negative electrode, and a non-aqueous electrolyte, wherein the positive electrode active material layer contains positive electrode active material particles having a particle size distribution in which a difference (D90−D10) between a 90% diameter (D90) and a 10% diameter (D10) as measured by laser diffractometry is more than 13 μm. In any cross-section of the positive electrode active material layer, a total area of positive electrode active material particles a is 20% or more relative to a total area of the cross-section, each of the positive electrode active material particles a having a particle diameter of 15 μm or more and a particle area of 0.8 or more times an area of a circle circumscribing the particle a.

According to an aspect of the present disclosure, it is possible to provide a non-aqueous electrolyte secondary battery in which charge/discharge-induced breakage of positive electrode active material particles is less likely to occur and in which deterioration in capacity and increase in internal resistance can be sufficiently reduced. The configuration of non-aqueous electrolyte secondary batteries according to the present disclosure is suitable, in particular, for high-capacity batteries.

DESCRIPTION OF EMBODIMENTS

Figure 1:
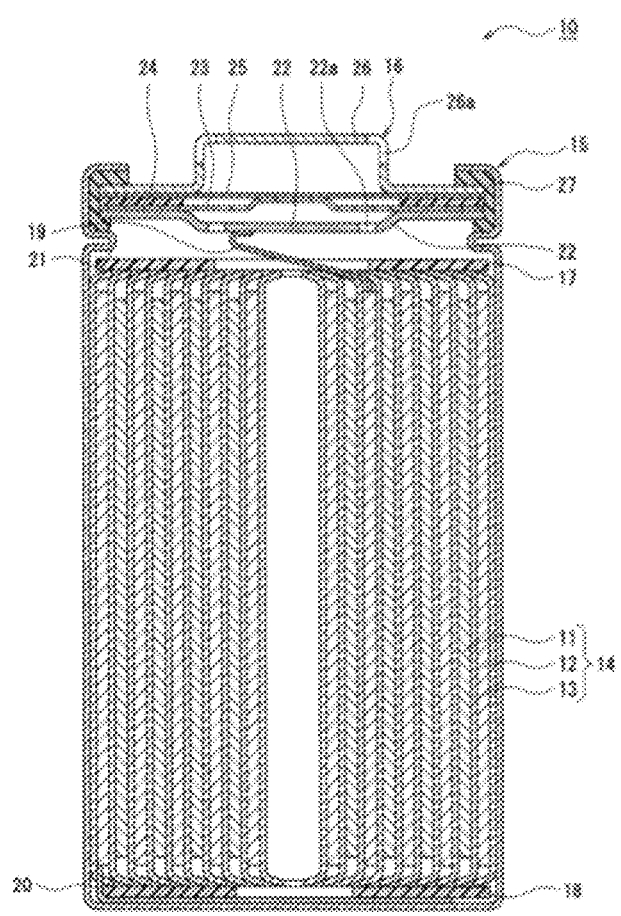
FIG. 1 is a cross-sectional plan view of a non-aqueous electrolyte secondary battery according to an exemplary embodiment.

In a non-aqueous electrolyte secondary battery according to an aspect of the present disclosure, positive electrode active material particles having a high proportion of particles with a particle diameter of 15 μm or more and having a broad particle size distribution are used to form a positive electrode active material layer. This can reduce charge/discharge-induced deterioration in capacity and increase in internal resistance to a large extent. In the positive electrode active material layer of the non-aqueous electrolyte secondary battery according to an aspect the present disclosure, charge/discharge-induced breakage of the positive electrode active material particles is less likely to occur. Such particle breakage may occur in a rolling step during production of a positive electrode; however, in the positive electrode active material layer according to the present disclosure, the particle breakage during a rolling step is also less likely to occur. Furthermore, the positive electrode active material layer according to the present disclosure is highly permeable to electrolyte solutions, so that an electrolyte solution can easily enter and exit from the positive electrode active material layer. It is believed that the use of the above-described structure in the positive electrode active material layer gives rise to favorable dispersion of the pressure imposed on each of the positive electrode active material particles and hence to reduced occurrence of particle breakage and also results in formation of interparticle voids that enable easy entry and exit of electrolyte solutions. Thus, charge/discharge-induced deterioration in capacity and increase in internal resistance are less likely to occur. Additionally, since an electrolyte solution enters and exits from the positive electrode active material layer according to the present disclosure uniformly and quickly, the occurrence of active material breakage which is caused by excessive charge/discharge of a part of the active material due to inhomogeneous reaction is reduced.

The configuration of the non-aqueous electrolyte secondary battery according to an aspect of the present disclosure is suitable for high-capacity batteries in which charge/discharge-induced change in volume of an electrode material is large and in which smooth movement of the electrolyte solution is required. For example, when SiO, which undergoes a large volume change in association with charge/discharge, is used as a negative electrode active material, a large amount of electrolyte solution needs to be supplied to the negative electrode. The use of the above positive electrode active material layer which permits easy entry and exit of the electrolyte solution makes it possible to satisfactorily meet such a need and achieve high battery performance.

Hereinafter, exemplary embodiments will be described in detail.

The drawings referred to in the description of embodiments are schematic, and the specific dimensional ratio etc. should be determined in consideration of the following description. In the following description, a cylindrical battery having a wound electrode assembly 14 contained in a cylindrical battery case is illustrated as an example. However, the structure of the electrode assembly is not limited to a wound structure and may be a stacked structure in which a plurality of positive electrodes and a plurality of negative electrodes are alternately stacked with separators interposed between the positive electrodes and negative electrodes. The battery case is not limited to a cylindrical case, and other examples of the battery case include a rectangular metal case (for a rectangular battery), a coin-shaped metal case (for a coin cell battery), and a resin case (for a laminated battery) made with a resin film.

FIG. 1 is a cross-sectional plan view of a non-aqueous electrolyte secondary battery 10 according to an exemplary embodiment. As illustrated in FIG. 1, the non-aqueous electrolyte secondary battery 10 includes an electrode assembly 14, a non-aqueous electrolyte (not shown), and a battery case containing the electrode assembly 14 and the non-aqueous electrolyte. The electrode assembly 14 has a wound structure in which a positive electrode 11 and a negative electrode 12 are wound together with a separator 13 interposed therebetween. The battery case is made up of a case body 15 in the form of a bottomed cylinder and a cover assembly 16 covering an opening portion of the body.

The non-aqueous electrolyte secondary battery 10 includes insulating plates 17 and 18 disposed, respectively, above and below the electrode assembly 14. In the example shown in FIG. 1, a positive electrode lead 19 attached to the positive electrode 11 extends through a through hole of the insulating plate 17 toward the cover assembly 16, while a negative electrode lead 20 attached to the negative electrode 12 extends outside the insulating plate 18 toward the bottom of the case body 15. The positive electrode lead 19 is coupled, by welding or other means, to the lower surface of a filter 22 provided as a bottom plate of the cover assembly 16, and a cap 26 provided as a top plate of the cover assembly 16 and electrically connected to the filter 22 serves as a positive electrode terminal. The negative electrode lead 20 is coupled to the inner surface of the bottom of the case body 15 by welding or other means, and the case body 15 serves as a negative electrode terminal.

The case body 15 is, for example, a metal container in the form of a bottomed cylinder. Between the case body 15 and the cover assembly 16 is provided a gasket 27, which ensures hermetic sealing of the interior of the battery case. The case body 15 has an overhang portion 21 supporting the cover assembly 16, the overhang portion 21 being formed, for example, by pressing the side surface of the case body from outside. The overhang portion 21 is preferably formed in a ring shape along the circumference of the case body 15 and supports the cover assembly 16 by its upper surface.

The cover assembly 16 has the filter 22 and a vent member disposed above the filter 22. The vent member covers an opening portion 22a of the filter 22, and can break when the internal pressure of the battery increases due to heat generation induced by internal short circuit or other cause. In the example shown in FIG. 1, the vent member provided consists of a lower vent member 23 and an upper vent member 25, and an insulating member 24 lying between the lower vent member 23 and upper vent member 25 and the cap 26 are further provided. The components constituting the cover assembly 16 are, for example, in the shape of a circular plate or ring, and the components other than the insulating member 24 are electrically connected to each other. A large increase in internal pressure of the battery causes, for example, the lower vent member 23 to break at its thin portion and thus causes the upper vent member 25 to swell toward the cap 26 and move away from the lower vent member 23, so that the electrical connection between the vent members is lost. A further increase in internal pressure leads to breakage of the upper vent member 25 and therefore emission of gas to the outside of the battery through an opening portion 26a of the cap 26.

Positive Electrode

The positive electrode includes a positive electrode current collector and a positive electrode active material layer formed on the current collector. As the positive electrode current collector, there can be used, for example, a foil of a metal such as aluminum which is stable in the range of the electric potential of the positive electrode or a film having a surface layer bearing such a metal. The positive electrode active material layer preferably contains a conductive material and a resin binder in addition to a positive electrode active material. The positive electrode can be produced, for example, by applying a positive electrode mixture slurry containing a positive electrode active material, a conductive material, a resin binder and the like onto a positive electrode current collector, drying the applied layer of slurry, and then rolling the applied layer to form a positive electrode active material layer over both surfaces of the current collector. The thickness of the positive electrode active material layer is, for example, 50 to 120 µm.

Figure 2:
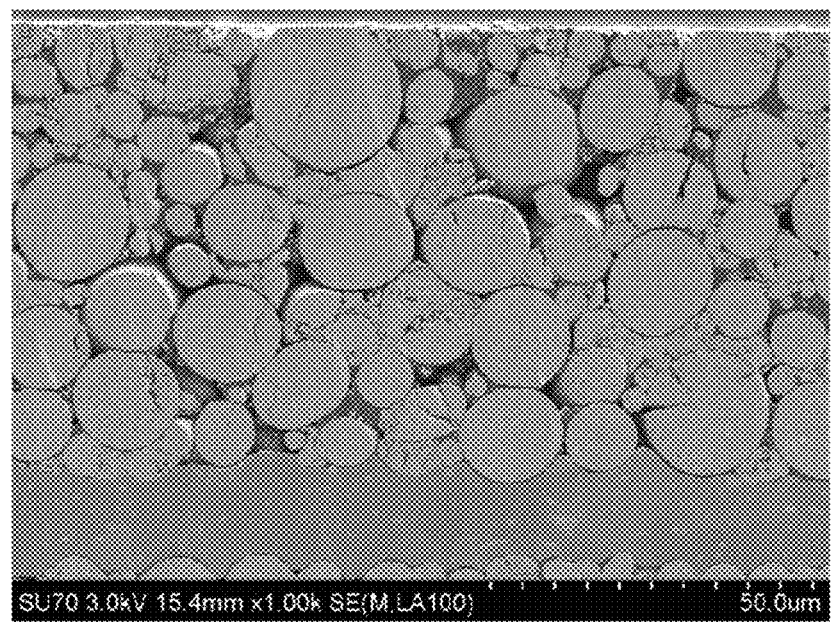
FIG. 2 shows an electron microscope photograph of a cross-section of a positive electrode according to an exemplary embodiment (Example 1).
Figure 3:
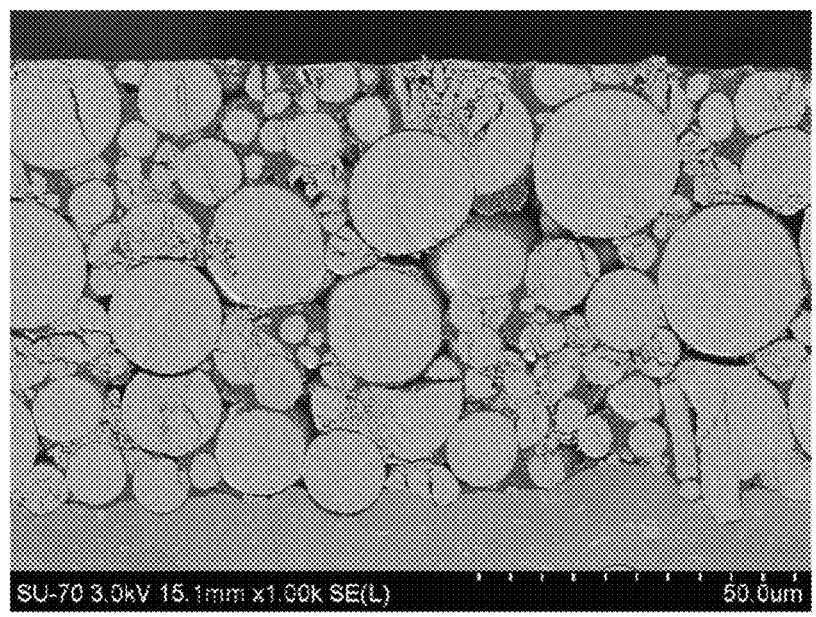
FIG. 3 shows an electron microscope photograph of a cross-section of a positive electrode according to an exemplary embodiment (Example 2).
Figure 4:
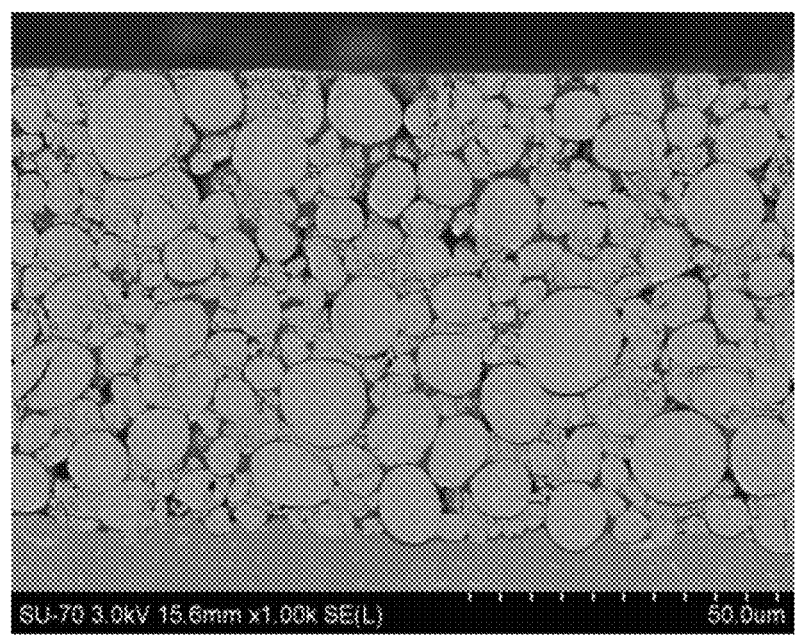
FIG. 4 shows an electron microscope photograph of a cross-section of a conventional positive electrode (Comparative Example 1).

FIG. 2 and FIG. 3 show scanning electron microscope (SEM) images of cross-sections of positive electrodes according to exemplary embodiments. For comparison, FIG. 4 shows a SEM image of a conventional positive electrode. The particles seen in each SEM image are positive electrode active material particles. As is apparent from FIGS. 2 to 4, a greater number of large-diameter positive electrode active material particles are present in the positive electrode active material layers according to exemplary embodiments than in the conventional positive electrode active material layer. Additionally, the positive electrode active material particles according to exemplary embodiments have a wider variation in particle diameter than the conventional positive electrode active material particles. That is, each of the positive electrode active materials according to exemplary embodiments is composed of a set of particles having a broad particle size distribution.

Additionally, the positive electrode active material particles, in particular large-diameter positive electrode active material particles, according to exemplary embodiments have a higher proportion of particles with a shape close to the shape of an exact circle than the conventional positive electrode active material particles. Furthermore, in the positive electrode active material layers according to examples, the voids between the positive electrode active material particles are larger than those in the conventional positive electrode active material layer, and the voids are arranged so as to form continuous flow paths extending along the thickness of the layers. The density of the positive electrode active material in the positive electrode active material layers according to examples is similar to the density in the conventional positive electrode active material layer or higher than the density in the conventional positive electrode active material layer. That is, the positive electrode active material layers according to exemplary embodiments contain a great number of positive electrode active material particles packed at a high density and also have interparticle voids through which electrolyte solutions easily flow.

The positive electrode active material layer contains positive electrode active material particles having a particle size distribution in which a difference (D90–D10) between a 90% diameter (D90) and a 10% diameter (D10) as measured by laser diffractometry is more than 13 μm. That is, the positive electrode active material contained in the positive electrode active material layer is composed of a set of particles having such a particle size distribution. D10 refers to a particle diameter at which a cumulative volume of particles sorted in order of increasing particle diameter is 10% of the total volume of the particles. D90 refers to a particle diameter at which the cumulative volume is 90% of the total volume of the particles. A large value of D90–D10 indicates that the positive electrode active material is composed of a set of particles having a broad particle size distribution. D90–D10 is preferably 13 to 25 μm and more preferably 13 to 21 μm. For example, D10 is 5 to 10 μm and D90 is 22 to 30 μm.

The positive electrode active material particles contained in the positive electrode active material layer have a median diameter (D50) as measured by laser diffractometry of, for example, 13 to 20 μm. D50 is preferably 14 to 19 μm. D50 refers to a particle diameter at which a cumulative volume of particles sorted in order of increasing particle diameter is 50% of the total volume of the particles. D50 can be considered a volume-based average particle diameter. Thus, for the positive electrode active material particles contained in the positive electrode active material layer, D50 is preferably 14 to 19 μm and D90–D10 is preferably 13 to 21 μm. In order to prevent the positive electrode active material particles from breaking through the separator during formation of the wound assembly, the maximum particle diameter of the positive electrode active material particles is preferably 60 μm or less. The particle diameters of the positive electrode active material can be measured using MT3300, a laser diffraction-scattering particle size distribution analyzer available from MicrotracBEL Corp.

In any cross-section of the positive electrode active material layer, a total area of positive electrode active material particles a is 20% or more relative to a total area of the cross-section, each of the positive electrode active material particles a having a particle diameter of 15 μm or more and a particle area of 0.8 or more times an area of a circle circumscribing the particle a. The positive electrode active material particles a present a particle diameter of 15 μm or more in a SEM observation of the positive electrode active material layer. That is, in any cross-section of the positive electrode active material layer, particles each of which has an area of 0.8 or more times the area of a circle circumscribing the particle (positive electrode active material particles a) account for 20% or more of positive electrode active material particles having a particle diameter of 15 μm or more. The observed cross-section of the positive electrode active material layer is a rectangular region with sides having a length corresponding to at least 50% of the thickness of the layer and is preferably a rectangular region having a length of 100 μm or more in an in-plane direction of the layer and a length of 50 μm or more in a thickness direction of the layer. The particle diameter refers to the diameter of a circle drawn to circumscribe each positive electrode active material particle in a SEM image of the cross-section of the positive electrode active material layer.

For each positive electrode active material particle a, the ratio of a particle area B to an area C of a circle circumscribing the particle a is 0.8 or more. The particle area B refers to the area of each of the positive electrode active material particles a. The ratio (B/C) of the area B of each positive electrode active material particle a to the area B of a circle circumscribing the particle a is an index indicative of the degree of circularity of the particle. The closer the ratio is to 1, the closer the shape of the cross-section of the particle is to the shape of an exact circle, and generally the closer the shape of the particle is to the shape of a sphere.

More preferably, the total area of the positive electrode active material particles a is 24% or more and 50% or less relative to the total area of the cross-section described above.

Preferably, in any cross-section of the positive electrode active material layer, a proportion D of the total number of the positive electrode active material particles a (positive electrode active material particles each having a particle diameter of 15 μm or more and a particle area of 0.8 or more times the area of a circle circumscribing the particle) to the total number of positive electrode active material particles having a particle diameter of 15 μm or more is more than 50%. That is, in any cross-section of the positive electrode active material layer, the proportion of the total number of positive electrode active material particles each having a particle diameter of 15 μm or more and a particle area of less than 0.8 times the area of a circle circumscribing the particle relative to the total number of positive electrode active material particles having a particle diameter of 15 μm or more is 50% or less.

In a positive electrode active material layer formed through rolling as described above, some particles among large-diameter positive electrode active material particles having a particle diameter of, for example, 15 μm or more fail to maintain a spherical shape. In any cross-section of the positive electrode active material layer of the positive electrode according to the present embodiment, the proportion D of the total number of the positive electrode active material particles a relative to the total number of particles having a particle diameter of 15 μm or more is more than 50% even after the rolling. The proportion D is, for example, 55 to 80%.

In a positive electrode active material layer having the structure as described above, the positive electrode active material particles are less likely to break, and voids that enable easy entry and exit of electrolyte solutions are formed between the particles. Thus, a battery including the positive electrode active material layer is less likely to suffer charge/discharge-induced deterioration in capacity and increase in internal resistance.

The positive electrode active material contains a lithium transition metal oxide as a main component and may consist essentially of a lithium transition metal oxide. A preferred example of the positive electrode active material is a lithium transition metal oxide in which the proportion of nickel (Ni) relative to the total number of moles of metal elements other than lithium (Li) is 85 mol % or more. The lithium transition metal oxide has a bedded salt-type crystal structure. On the surface of the particles of the lithium transition metal oxide, there may be fare particles of an inorganic compound such as an oxide, including aluminum oxide, or a lanthanoid-containing compound.

The lithium transition metal oxide is a composite oxide represented, for example, by formula $Li\alpha Ni_xM_{(1-x)}O_2$ wherein $0.1 \leq \alpha \leq 1.2$, $0.80 \leq x < 1$, and M includes at least Co and Al. A Ni—Co—Al-containing lithium transition metal oxide provides a high capacity and good output characteristics. The Ni content is preferably 85 mol % or more ($0.85 \leq x < 1$) in order to achieve, for example, a reduction in cost and increase in capacity. Increasing the Ni content tends to lead to an increase in charge/discharge-induced volume change of the positive electrode active material particles.

Examples of metal elements which may be contained in the lithium transition metal oxide other than Ni, cobalt (Co), and aluminum (Al) include boron (B), magnesium (Mg), titanium (Ti), vanadium (V), chromium (Cr), manganese (Mn), iron (Fe), copper (Cu), zinc (Zn), gallium (Ga), strontium (Sr) zirconium (Zr), niobium (Nb), indium (In), tin (Sn), tantalum (Ta), and tungsten (W). Among these, W is preferably contained. W is preferably present in the crystal structure of the lithium transition metal oxide in the form of a solid solution. However, for example, a W-containing compound (such as tungsten oxide) may be attached to the surface of the lithium transition metal oxide. One lithium transition metal oxide as described above may be used alone or two or more such lithium transition metal oxides may be used in combination.

The conductive material which may be contained in the positive electrode active material layer is used to increase the electrical conductivity of the positive electrode active material layer. Examples of the conductive material include carbon materials such as carbon black, acetylene black. Ketjenblack, and graphite. These may be used alone, or two or more thereof may be used in combination.

The resin binder which may be contained in the positive electrode active material layer is used to maintain good contact between the positive electrode active material and the conductive material and increase adhesion of the positive electrode active material etc. to the surface of the positive electrode current collector. Examples of the resin binder include fluororesins such as polytetrafluoroethylene (PTFE) and polyvinylidene fluoride (PVdF), polyacrylonitrile (PAN), polyimide resins, acrylic resins, and polyolefin resins. These resins may be used in combination, for example, with a cellulose derivative such as carboxymethyl cellulose (CMC) or a salt thereof (such as CMC-Na, CMC-K, or CMC-$NH_4$) or with polyethylene oxide (PEO). One of these resins may be used alone, or two or more thereof may be used in combination.

Negative Electrode

The negative electrode includes a negative electrode current collector and a negative electrode active material layer formed on the current collector. As the negative electrode current collector, there can be used, for example, a foil of a metal such as copper which is stable in the range of the electrical potential of the positive electrode or a film having a surface layer bearing such a metal. The negative electrode active material layer preferably contains a resin binder in addition to a negative electrode active material. The negative electrode can be produced, for example, by applying a negative electrode mixture shiny containing a negative electrode active material and a resin binder onto a negative electrode current collector, drying the applied layer of slurry, and then rolling the applied layer to form a negative electrode active material layer over both surfaces of the current collector.

The negative electrode active material is not particularly limited as long as it is capable of reversibly absorbing and releasing lithium ions, and examples of materials that can be used include: carbon materials such as natural graphite and artificial graphite; metals such as silicon (Si) and tin (Sn) which can form an alloy with lithium; and oxides containing a metal element such as Si or Sn. One negative electrode active material may be used alone, or two or more negative electrode active materials may be used in combination. For example, silicon oxide is used as the negative electrode active material, and a mixture of silicon oxide and graphite is preferably used.

Preferred silicon oxide is an oxide represented by formula $SiO_x$ wherein $0.5 \leq x \leq 1.5$. $SiO_x$ has, for example, a structure in which fine Si particles are dispersed in a $SiO_2$ layer. The surface of the particles of $SiO_x$ is preferably coated with a carbon-containing material. The carbon coating is composed of, for example, amorphous carbon. When $SiO_x$ and graphite are used in combination, the mass ratio between $SiO_x$ and graphite is preferably 1:99 to 30:70.

As in the positive electrode, a fluorine resin, PAN, a polyimide resin, an acrylic resin, a polyolefin resin or the like can be used as the resin binder. When the mixture slurry is prepared with an aqueous solvent, CMC, a salt thereof, styrene-butadiene rubber (SBR), polyacrylic acid (PAA), a salt thereof (such as PAA-Na or PAA-K), polyvinyl alcohol or the like is preferably used.

Separator

As the separator, there is used a porous sheet having ion permeability and insulating properties. Specific examples of the porous sheet include porous thin films, woven fabrics, and non-woven fabrics. Preferred as the material of the separator are, for example, olefin resins such as polyethylene and polypropylene and cellulose. The separator may have a single-layer structure or a multi-layer structure. A heat-resistant layer containing a heat-resistant material is preferably formed on the surface of the separator. Examples of the heat-resistant material include: polyamide resins such as aliphatic polyamide and aromatic polyamide (aramid); and polyimide resins such as polyamide-imide and polyimide.

Non-Aqueous Electrolyte

The non-aqueous electrolyte contains a non-aqueous solvent and an electrolyte salt dissolved in the non-aqueous solvent. Examples of materials that can be used as the non-aqueous solvent include esters, ethers, nitriles such as acetonitrile, amides such as dimethylformamide, and mixed solvents of two or more thereof. The non-aqueous solvent may contain a halogen substitution, product resulting from replacement of at least a part of hydrogen of any of the above solvents with halogen atom such as fluorine.

Examples of the esters include: cyclic carbonic acid esters such as ethylene carbonate (EC), propylene carbonate (PC), and butylene carbonate; chain carbonic acid esters such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylic acid esters such as γ-butyrolactone (GBL) and γ-valerolactone (GVL); and chain carboxylic acid esters such as methyl acetate, ethyl acetate, propyl acetate, methyl propionate (MP), and ethyl propionate.

Examples of the ethers include: cyclic ethers such as 1,3-dioxolane, 4-methyl-1,3-dioxolane, tetrahydrofuran, 2-methyltetrahydrofuran propylene oxide, 1,2-butylene oxide, 1,3-dioxane, 1,4-dioxane, 1,3,5-trioxane, furan, 2-methylfuran, 1,8-cineol, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the halogen substitution product, there is preferably used a fluorinated cyclic carbonic acid ester such as fluoroethylene carbonate (FEC), a fluorinated chain carbonic acid ester, or a fluorinated chain carboxylic acid ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n=1 or 2), $LiB_{10}Cl_{10}$, LiCl, LiBr, LiI, chloroborane lithium, lower aliphatic lithium carboxylate borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are each an integer of 1 or more}. One of these lithium salts may be used alone, or a mixture of two or more thereof may be used. Among these lithium salts, $LiPF_6$ is preferably used from the viewpoint of ion conductivity, electrochemical stability and the like. The concentration of the lithium salt is preferably 0.8 to 1.8 moles per liter of the non-aqueous solvent.

EXAMPLES

Hereinafter, the present disclosure will be further described by Examples. The present disclosure is not limited to these Examples.

Example 1

Production of Positive Electrode

Particles of a lithium nickel cobalt aluminum composite oxide represented by $LiNi_{0.91}Co_{0.06}Al_{0.03}O_2$ were used as a positive electrode active material. The composite oxide particles (positive electrode active material particles) had a D50 of 14.2 μm and a D90−D10 of 13.4 μm. The particle diameters of the positive electrode active material particles were measured using MT3300, a laser diffraction-scattering particle size distribution analyzer available from Microtrac-BEL Corp. 100 parts by mass of the positive electrode active material particles, 1.25 parts by mass of acetylene black (AB), and 1.0 part by mass of polyvinylidene fluoride (PVdF) were mixed, and an appropriate amount of N-methyl-2-pyrrolidone (NMP) was then added to prepare a positive electrode mixture slurry. Next, the positive electrode mixture slurry was applied to both surfaces of a positive electrode current collector consisting of an aluminum foil, and the applied layer of slurry was dried. The resulting laminate was cut into a predetermined size for use as an electrode, and the applied layer was rolled with a roller to produce a positive electrode having a positive electrode current collector with both surfaces coated with a positive electrode active material layer. The density of the positive electrode active material layer was controlled to 3.57 g/cc.

A cross-section of the positive electrode active material layer was observed with a SEM, and a ratio Na of positive electrode active material particles a was calculated. The positive electrode active material particles a were positive electrode active material particles that have a particle diameter of 15 μm or more and for each of which the ratio B/C, namely the ratio of the particle area B to the area C of a circle drawn to circumscribe the particle, is determined to be 0.8 or more. FIG. 2 shows the SEM image of the cross-section of the positive electrode active material layer. The ratio Na was determined in a rectangular region having a length of 261 μm in an in-plane direction of the positive electrode active material layer and a length of 147 μm in a thickness direction of the layer (the total area Z of the cross-section was 38478 μm$^2$). The ratio Na thus determined was 24%.

Production of Negative Electrode

As a negative electrode active material, 93 parts by mass of graphite powder and 7 parts by mass of silicon oxide (SiO) particles with surfaces coated with amorphous carbon were used, and they were mixed with 1 part by mass of carboxymethyl cellulose sodium (CMC-Na) and 1 part by mass of styrene-butadiene rubber (SBR), and then an appropriate amount of water was added to prepare a negative electrode mixture slurry. Next, the negative electrode mixture slurry was applied to both surfaces of a negative electrode current collector consisting of a copper foil, and the applied layer of slurry was dried. The resulting laminate was cut into a predetermined size for use as an electrode, and the applied layer was rolled with a roller to produce a negative electrode having a negative electrode current collector with both surfaces coated with a negative electrode active material layer.

Preparation of Non-Aqueous Electrolyte Solution

Ethylene carbonate (EC), dimethyl carbonate (DMC), and methyl ethyl carbonate (MEC) were mixed in a volume ratio of 20:75:5. $LiPF_6$ was dissolved in the mixed solvent at a concentration of 1.4 mol/L . A non-aqueous electrolyte solution was thus prepared.

Production of Battery

An aluminum lead was attached to the positive electrode, and a nickel lead was attached to the negative electrode. The positive electrode and negative electrode were spirally wound with a separator interposed therebetween. A spirally wound electrode assembly was thus produced. This electrode assembly was placed in a battery case body in the form of a bottomed cylinder having an outer diameter of 18.2 mm and a height of 65 mm, the non-aqueous electrolyte solution was injected into the battery case body, and then the opening portion of the battery case body was closed with a gasket and a cover assembly to produce a 18650-type cylindrical non-aqueous electrolyte secondary battery having a battery capacity of 3463 mAh.

Example 2

A positive electrode and a non-aqueous electrolyte secondary battery were produced in the same manner as in Example 1, except for using lithium nickel cobalt aluminum composite oxide particles having a D50 of 17.6 μm and a D90–D10 of 16.9 μm as a positive electrode active material. The density of the positive electrode active material layer was controlled to 3.57 g/cc. The ratio Na was also determined in the same manner as in Example 1, and the result is shown in Table 1 (the same applies to Examples described below). FIG. 3 shows a SEM image of a cross-section of the positive electrode active material layer.

Example 3

A positive electrode and a non-aqueous electrolyte secondary battery were produced in the same manner as in Example 2, except for controlling the density of the positive electrode active material layer to 3.60 g/cc.

Example 4

A positive electrode and a non-aqueous electrolyte secondary battery were produced in the same manner as in Example 1, except for using lithium nickel cobalt aluminum composite oxide particles having a D50 of 18.3 μm and a D90–D10 of 20.4 μm as a positive electrode active material and for preparing a positive electrode mixture slurry for production of the electrode by mixing 100 parts by mass of the positive electrode active material particles, 1.0 part by mass of AB, and 0.9 parts by mass of PVdF and then adding an appropriate amount of N-methyl-2-pyrrolidone (NMP). The density of the positive electrode active material layer was controlled to 3.66 g/cc.

Example 5

A positive electrode and a non-aqueous electrolyte secondary battery were produced in the same manner as in Example 4, except for using a positive electrode active material prepared by mixing tungsten oxide ($WO_3$) with lithium nickel cobalt aluminum composite oxide particles washed with water and by heat-treating the mixture at 200°C. for 1 hour. The density of the positive electrode active material layer was controlled to 3.66 g/cc. The W content in the positive electrode active material was 0.15 mol % relative to the total molar amount of metal elements (Ni, Co, and Al) other than Li.

Example 6

A positive electrode was produced in the same manner as in Example 1, except for using lithium nickel cobalt aluminum composite oxide particles having a D50 of 16.5 μm and a D90–D10 of 17.0 μm as a positive electrode active material and for preparing a positive electrode mixture slurry for production of the electrode by mixing 100 parts by mass of the positive electrode active material particles, 0.75 parts by mass of AB, and 0.675 parts by mass of PVdF and then adding an appropriate amount of NMP. The density of the positive electrode active material layer was controlled to 3.66 g/cc. A non-aqueous electrolyte secondary battery was produced in the same manner as in Example 1, except for using graphite powder (100 parts by mass) alone as a negative electrode active material.

Comparative Example 1

A positive electrode and a non-aqueous electrolyte secondary battery were produced in the same manner as in Example 1, except for using lithium nickel cobalt aluminum composite oxide particles having a D50 of 11.6 μm and a D90–D10 of 10.5 μm as a positive electrode active material. The density of the positive electrode active material layer was controlled to 3.57 g/cc. FIG. 4 shows a SEM image of a cross-section of the positive electrode active material layer.

Comparative Example 2

A positive electrode and a non-aqueous electrolyte secondary battery were produced in the same manner as in Comparative Example 1, except for controlling the density of the positive electrode active material layer to 3.54 g/cc.

Comparative Example 3

A positive electrode was produced in the same manner as in Comparative Example 1, except for preparing a positive electrode mixture slurry for production of the electrode by mixing 100 parts by mass of the positive electrode active material particles, 0.75 parts by mass of AB, and 0.675 parts by mass of PVdF and then adding an appropriate amount of NMP and except for controlling the density of the positive electrode active material layer to 3.66 g/cc. A non-aqueous electrolyte secondary battery was produced in the same manner as in Comparative Example 1, except for using graphite powder (100 parts by mass) alone as a negative electrode active material.

The above non-aqueous electrolyte secondary batteries were subjected to performance evaluation by methods described below. The evaluation results are shown in Table 1 or Table 2. Table 1 and Table 2 show the physical properties of the positive electrodes and other data together with the evaluation results.

Evaluation of Electrolyte Leaching Rate

An evaluation was made according to the following procedures (1) to (4). A higher value of the conductivity determined as below indicates a higher rate of leaching of the electrolyte from the electrode.

(1) The battery is discharged and then disassembled, and the electrode plate is cut out. The cut piece of the electrode plate (sample) is washed to remove the electrolyte solution and then dried.

(2) The sample piece is placed in a laminated bag containing an electrolyte solution (1M LiPF6, EC/EMC=3/7) and a mixed solvent (EC/EMC=3/7) and subjected to impregnation under reduced pressure (condition: repetitions of holding at −0.05 MPa for 2 minutes followed by holding at ordinary pressure for 2 minutes) for 1 hour or more to impregnate the sample piece with the electrolyte solution. After that, the sample piece is withdrawn from the bag.

(3) A stirrer and 25 mL of the above mixed solvent are placed in a polypropylene container, an electrode of an electrical conductivity meter (CM-30R available from DDK-TOA Corporation) is immersed in the solvent, and the stirrer is rotated.

(4) The sample piece is placed in the container, and the conductivity is measured.

Evaluation of Capacity Retention Rate

At temperatures of 25° C. and 45° C. each battery was subjected to a charge/discharge cycle consisting of charging the battery at a constant current of 0.3 hour rate until a battery voltage of 4.2 V was reached; further charging the battery at a constant voltage of 4.2 V until a cut off current of 0.02 hour rate was reached; allowing the battery to rest for 20 minutes; then discharging the battery at a constant discharge current of 0.5 hour rate until a battery voltage of 2.5 V was reached; and allowing the battery to rest for 20 minutes. Such a charge/discharge cycle was repeated 200 times, and the proportion of the discharge capacity at the 200th cycle relative to the discharge capacity at the first cycle (the capacity retention rate) was determined.

Evaluation of Increase Rate in DCR

At temperatures of 25° C. and 45° C. a difference between the voltage after the 20-minute rest period following the charge at 4.2 V and the voltage after 10-second discharge at a current of 0.5 C was determined for each of the first and 200th cycles, and a DCR was determined by dividing the difference by the value of the current of 0.5 C.

TABLE 1

| | | | Example 1 | Example 2 | Example 3 | Example 4 | Example 5 | Example 6 |
|---|---|---|---|---|---|---|---|---|
| Positive electrode | D50 | μm | 14.2 | 17.6 | 17.6 | 18.3 | 18.3 | 16.5 |
| | D90-D10 | μm | 13.4 | 16.9 | 16.9 | 20.4 | 20 | 17.0 |
| | W content | mol % | — | — | — | — | 0.15 | — |
| | Na | % | 24 | 34 | 35 | 34 | 33 | 25 |
| | Density of positive electrode active material layer | g/cc | 3.45 | 3.45 | 3.60 | 3.66 | 3.66 | 3.66 |
| | Electrolyte leaching rate | μmol/cm²s | 0.027 | 0.028 | 0.026 | 0.030 | 0.032 | 0.029 |
| Negative electrode | Negative electrode active material | Mass ratio | C:SiO = 93:7 | C:SiO = 93:7 | C:SiO = 93:7 | C:SiO = 93:7 | C:SiO = 93:7 | C = 100 |
| Battery | Battery capacity | mAh | 3511 | 3501 | 3531 | 3542 | 3560 | 3344 |
| | Capacity retention rate (25□) | % | 87 | 87 | 87 | 87 | 92 | 80 |
| | Increase rate in DCR (25□) | % | 1.5 | 1.5 | 1.5 | 1.3 | 1.2 | 1.9 |
| | Capacity retention rate (45□) | % | — | 84 | 84 | 85 | 87 | — |
| | Increase rate in DCR (45□) | % | — | 1.9 | 1.9 | 1.7 | 1.7 | — |

TABLE 2

| | | | Comparative Example 1 | Comparative Example 2 | Comparative Example 3 |
|---|---|---|---|---|---|
| Positive electrode | D50 | μm | 11.6 | 11.6 | 11.6 |
| | D90-D10 | μm | 10.5 | 10.5 | 10.5 |
| | W content | mol % | — | — | — |
| | Na | % | 8 | 9 | 8 |
| | Density of positive electrode active material layer | g/cc | 3.57 | 3.45 | 3.66 |
| | Electrolyte leaching rate | μmol/cm²s | 0.025 | 0.025 | 0.026 |
| Negative electrode | Negative electrode active material | Mass ratio | C:SiO = 93:7 | C:SiO = 93:7 | C = 100 |
| Battery | Battery capacity | mAh | 3463 | 3398 | 3340 |
| | Capacity retention rate (25□) | % | 85 | — | 78 |
| | Increase rate in DCR (25□) | % | 1.7 | — | 1.9 |
| | Capacity retention rate (45□) | % | 83 | — | — |
| | Increase rate in DCR (45□) | % | 2.1 | — | — |

As shown in Table 1 and Table 2, all of the batteries of Examples 1 to 5 exhibited a higher capacity retention rate and a smaller increase rate in DCR than the battery of Comparative Example 1. That is, for the batteries of Examples 1 to 5, deterioration in capacity and increase in internal resistance were reduced. As for the cases where graphite was used alone as a negative electrode active material, it was found that the battery of Example 6 was less likely to suffer a deterioration in capacity than the battery of Comparative Example 3. This led to the conclusion that deterioration in capacity and increase in internal resistance could be reduced when, in any cross-section of the positive electrode active material layer, the total area of the positive electrode active material particles a, each of which had a particle diameter of 15 μm or more and a particle area of 0.8 or more times the area of a circle circumscribing the particle a, was 20% or more relative to the total area of the cross-section. This effect was particularly significant in high-capacity batteries in which charge/discharge-induced change in volume of an electrode material was large and in which smooth movement of the electrolyte solution was required, such as batteries like those of Examples 1 to 5 in which SiO was used as a negative electrode active material.

INDUSTRIAL APPLICABILITY

The present invention is applicable to non-aqueous electrolyte secondary batteries.

REFERENCE SIGNS LIST

10 Non-aqueous electrolyte secondary battery
11 Positive electrode

12 Negative electrode
13 Separator
14 Electrode assembly
15 Case body
16 Cover assembly
17, 18 Insulating plate
19 Positive electrode lead
20 Negative electrode lead
21 Overhang portion
22 Filter
22a Opening portion
23 Lower vent member
24 Insulating member
25 Upper vent member
26 Cap
26a Opening portion
27 Gasket

The invention claimed is:

1. A non-aqueous electrolyte secondary battery comprising a positive electrode including a positive electrode active material layer, a negative electrode, and a non-aqueous electrolyte, wherein
the positive electrode active material layer contains positive electrode active material particles having a particle size distribution in which a difference (D90–D10) between a 90% diameter (D90) and a 10% diameter (D10) as measured by laser diffractometry is equal to or more than 16.9 μm,
in any cross-section of the positive electrode active material layer, a total area of positive electrode active material particles a is 20% or more relative to a total area of the cross-section, each of the positive electrode active material particles a having a particle diameter of 15 μm or more and a particle area of 0.8 or more times an area of a circle circumscribing the particle A,
wherein the positive electrode active material is a lithium transition metal oxide in which a proportion of nickel (Ni) relative to a total number of moles of metal elements other than lithium (Li) is 85 mol% or more, and
wherein the lithium transition metal oxide is an oxide represented by formula $LiaNi_xM_{1-x}O_2$ wherein $0.1 \leq \alpha \leq 1.2$, $0.85 \leq x < 1$, and M comprises at least Co and Al.

2. The non-aqueous electrolyte secondary battery according to claim 1, wherein in any cross-section of the positive electrode active material layer, a proportion of a total number of the positive electrode active material particles a relative to a total number of positive electrode active material particles having a particle diameter of 15 μm or more is more than 50%.

3. The non-aqueous electrolyte secondary battery according to claim 1, wherein the lithium transition metal oxide contains tungsten (W).

4. The non-aqueous electrolyte secondary battery according to claim 1, wherein the negative electrode contains, as a negative electrode active material, silicon oxide represented by formula $SiO_x$ wherein $0.5 \leq x \leq 1.5$.

5. The non-aqueous electrolyte secondary battery according to claim 1, wherein the difference (D90–D10) is 16.9 to 25μtm.

6. The non-aqueous electrolyte secondary battery according to claim 1, wherein the positive electrode active material particles have a median diameter (D50) as measured by laser diffractometry of 13 to 20 μm.

7. The non-aqueous electrolyte secondary battery according to claim 1, wherein the 10% diameter (D10) is 5 to 10μm and the 90% diameter (D90) is 22 to 30 μm.

* * * * *